Patented July 14, 1942

2,289,916

UNITED STATES PATENT OFFICE 2,289,916

TREATMENT OF HYDROCARBONS

Vasili Komarewsky, Chicago, Ill., assignor to Universal Oil Products Company, Chicago, Ill., a corporation of Delaware No Drawing. Application April 21, 1939, Serial No. 269,166

2 Claims. (Cl. 260—668)

This invention relates to the conversion of hydroaromatic hydrocarbons into aromatic hydrocarbons.

More specifically it is concerned with a process involving the use of special catalysts and specific conditions of operation in regard to temperature, pressure, and time of catalytic contact whereby hydro-aromatic hydrocarbons, including the cyclohexane derivatives which are generally known as naphthenic hydrocarbons, can be converted efficiently into aromatic hydrocarbons.

The search for catalysts to specifically control and accelerate the desired conversion reactions among hydrocarbons has been attended with the usual difficulties encountered in finding catalysts for other types of reactions, since there are no basic laws or rules for predicting the effectiveness of catalytic materials and the art as a whole is in a more or less empirical state. In using many catalysts even in connection with conversion reactions among pure hydrocarbons and particularly in connection with the conversion of the relatively heavy distillates and residua which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores.

In one specific embodiment the present invention comprises the conversion of hydro-aromatic hydrocarbons into aromatic hydrocarbons by subjecting them at a temperature of the order of 300–400° C. to contact with catalytic material comprising essentially reduced cobalt and aluminum oxide.

As indicating generally the types of compounds which can be treated by the present process to give material yields of aromatic hydrocarbons, the following tabulation is given:

| Formula | Name | Mp. | Bp. | Specific gravity |
|---|---|---|---|---|
| | | °C. | °C. | |
| $C_6H_{10}$ | Cyclohexene | −103.7 | 83.3 | 0.810 |
| $C_6H_{12}$ | Cyclohexane | 6.5 | 81.4 | 0.779 |
| $C_7H_{12}$ | Methylcyclohexene-1 | | 110–1 | 0.809 |
| | Methylcyclohexene-3 | | 103 | 0.800 |
| $C_7H_{14}$ | Methylcyclohexane | −126 | 101 | 0.769 |
| $C_{10}H_{12}$ | Tetralin | −31 | 206–7 | 0.973 |
| $C_{10}H_{18}$ | Decalin (cis) | −125 | 193 | 0.895 |
| | Decalin (trans) | | 185 | 0.872 |
| $C_{12}H_{22}$ | Dicyclohexyl | | 256 | |
| $C_{14}H_{26}$ | 1,2-dicyclohexylethane | | 270 | 0.884 |

Since the compounds listed above and others of isomeric or more complex character are capable of conversion into substantial yields of aromatic hydrocarbons by the present process, it is evident that the reaction mechanism must vary considerably and involve not only simple splitting off of hydrogen, but in some cases isomerization. However, it is not intended to comment further on this point since the invention is based upon experimental results.

It is within the scope of this invention to subject mixtures of hydro-aromatic hydrocarbons to such catalytic treatment, the mixtures being made by the blending of individual compounds or produced as distillate in the treatment of various hydrocarbon fractions. Thus such fractions containing relatively high proportions of naphthenic hydrocarbons may be processed or reformed to produce aromatic hydrocarbons therein and improve their antiknock value.

The preferred catalysts for promoting the dehydrogenation of naphthenes and other hydroaromatics comprises alumina supporting reduced cobalt in various percentages, depending upon the catalytic activity required. According to one method of preparation, cobalt hydroxide, or a hydrated cobalt oxide, is precipitated together with aluminum hydroxide by the action in solution of sodium aluminate on cobalt nitrate. The combined hydroxides, sometimes referred to as hydrated oxides, are washed anion free, dried and then reduced in hydrogen at a temperature in the approximate order of 400–425° C. Different proportions of sodium aluminate and a cobalt salt may be used in the catalyst preparation, but optimum results are generally obtained with a catalyst containing 20–40% of cobalt and 80–60% of alumina. Also separately precipitated aluminum hydroxide or precipitated hydrous aluminum oxide may be activated by a compound of cobalt.

Alternatively other types of alumina may be employed. For this purpose the alumina is preferably of an active character, such as is producible by the heating of such natural minerals as hydragrillite ($Al_2O_3 \cdot 3H_2O$), bauxite $$(Al_2O_3 \cdot 2H_2O)$$

and dawsonite ($Na_3Al(CO_3)_3 \cdot 2Al(OH)_3$) at suitable temperatures corresponding to removal of water and carbon dioxide.

The alumina is worked up into granular form of moderate mesh (usually of the order of 4–20), pelleted, or extruded; and the resultant particles are impregnated with a cobalt salt, such as the nitrate, by treatment with an aqueous solution thereof, the absorbed or occluded salt being first transformed to oxides by calcination of the composite and then subjected to the action of hydrogen or of other reducing gases to form the desired cobalt which functions as the principal catalyst for the reactions. As already stated the proportion of cobalt to alumina may be varied considerably, depending upon the activity required for dehydrogenating specific hydro-aromatic homologs which will obviously vary as to their stability.

In the operation of the process a hydro-aromatic hydrocarbon is vaporized at substantially atmospheric pressure, where this can be effected without decomposition, and the vapors are passed over a stationary section of the dehydrogenation catalyst at a temperature determined by tests to obtain the optimum production of aromatic hydrocarbons generally employing a time of contact in the order of 10-20 seconds. In the case of the higher boiling hydro-aromatic derivatives, these may be vaporized under a reduced pressure which may be as low as approximately 0.001 atmosphere to prevent undesirable decomposition reactions. After the passage of the hydro-aromatic or naphthenic hydrocarbon over the catalyst the products may be treated with sulfur dioxide, or another suitable solvent, or by other means to remove aromatic hydrocarbons produced by the dehydrogenation. The naphthenic hydrocarbons remaining after separation of the aromatic hydrocarbons are recycled to further dehydrogenation treatment in the presence of the cobalt-alumina catalyst.

The following example is introduced to show results normally obtainable in the operation of the process, although not with the intention of unduly limiting the scope of the invention:

A cobalt oxide-alumina catalyst was prepared by co-precipitation and reduced as indicated above so that the finished catalyst contained 30% cobalt and 70% alumina. This catalytic material was then used as a filler in a suitable chamber through which cyclohexane was passed at 300° C. under atmospheric pressure whereby dehydrogenation occurred to an extent corresponding to the production of 10% benzene per pass. In a further run at 350° C., 35% of the cyclohexane was thus converted into benzene per pass over the catalyst and gases were formed consisting essentially of hydrogen. By separating the benzene from the product and returning the unconverted cyclohexane to further contact with the catalyst, mixing five volumes of recycle stock with each volume of fresh feed the total dehydrogenation reached 88%.

The nature of the present invention and its practical application are evident from the preceding specification and illustrative data presented, although neither section is intended to unduly limit its generally broad scope.

I claim as my invention:

1. A process for converting a hydro-aromatic hydrocarbon into an aromatic hydrocarbon which comprises subjecting said hydro-aromatic hydrocarbon to contact at a temperature in the approximate range of 300-400° C. under a pressure in the approximate range of 0.001 to 1.0 atmosphere with a composite catalytic material consisting of approximately 20-40% cobalt and 80-60% alumina produced by co-precipitating hydroxides of cobalt and aluminum, drying the precipitated materials, and reducing to produce a mixture of cobalt and alumina.

2. A process for producing aromatic hydrocarbons which comprises subjecting a hydro-aromatic hydrocarbon to dehydrogenating conditions in the presence of a co-precipitated mixture of cobalt hydroxide and aluminum hydroxide which has been dried and reduced to form a solid composite of metallic cobalt and alumina.

VASILI KOMAREWSKY.